United States Patent [19]
Overby

[11] Patent Number: 6,015,158
[45] Date of Patent: Jan. 18, 2000

[54] HEAVY DUTY TRUCK SUSPENSION

[75] Inventor: Jerry Overby, Sioux Falls, S. Dak.

[73] Assignee: Timbren Industries Inc., Ajax, Canada

[21] Appl. No.: 09/103,854

[22] Filed: Jun. 24, 1998

[51] Int. Cl.[7] .................................................. B60G 11/34
[52] U.S. Cl. ............................ 280/124.163; 280/124.165; 280/124.175; 280/FOR 177
[58] Field of Search ....................... 280/124.17, 124.175, 280/124.162, 124.165, 124.1, 124.163, 124.164, FOR 177, 175

[56] References Cited

U.S. PATENT DOCUMENTS 4,099,741  7/1978  Sweet et al. .
5,024,462  6/1991  Assh .
5,507,516  4/1996  Reast .

*Primary Examiner*—Eric Culbreth
*Attorney, Agent, or Firm*—Leo J. Aubel

[57] ABSTRACT

A front axle suspension for a heavy duty vehicle including an elongated leaf spring having its front end affixed to the vehicle frame. The spring has its mid section mounted to the axle beam. An equalizer lever assembly is mounted on the rear end of the leaf spring for pivotal movement about an axis transverse to the frame. The rear end of the lever is affixed a shackle pivotally affixed to the frame. A rubber spring is positioned on the forward end of the lever to bear against the underside of the frame. The leaf spring and the equalizer assembly including the rubber spring combine to provide a smooth ride and improved steering control.

2 Claims, 1 Drawing Sheet

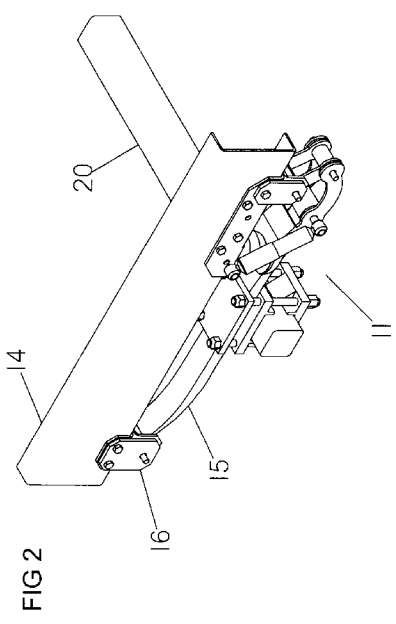
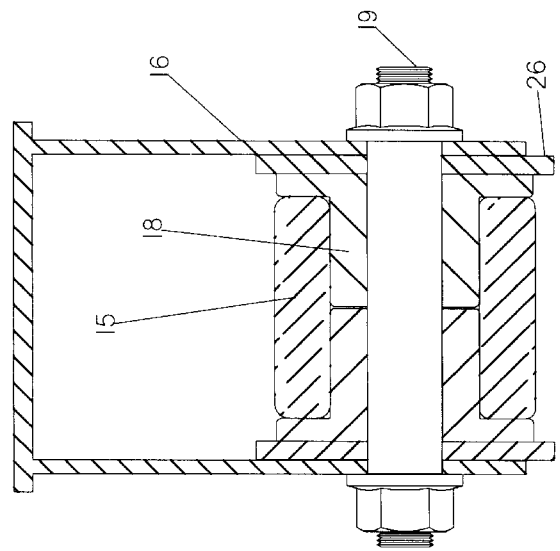
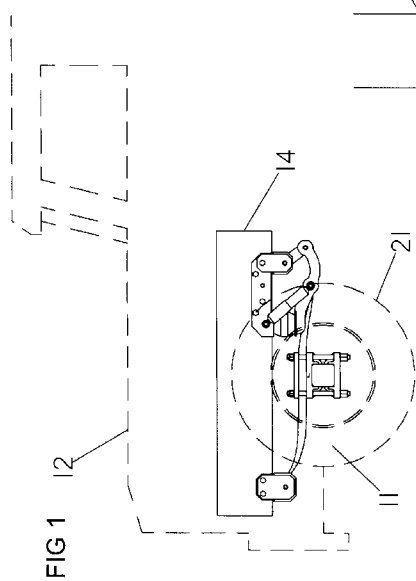
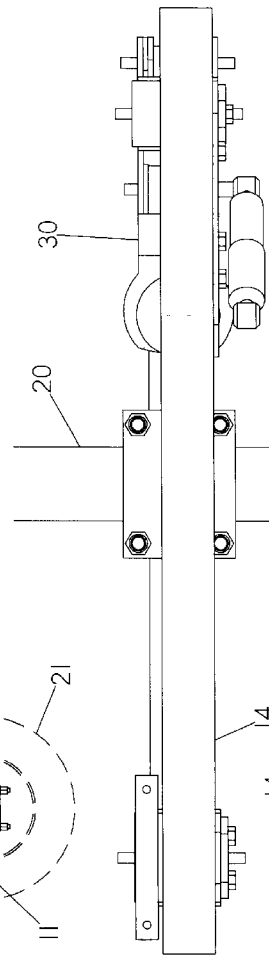
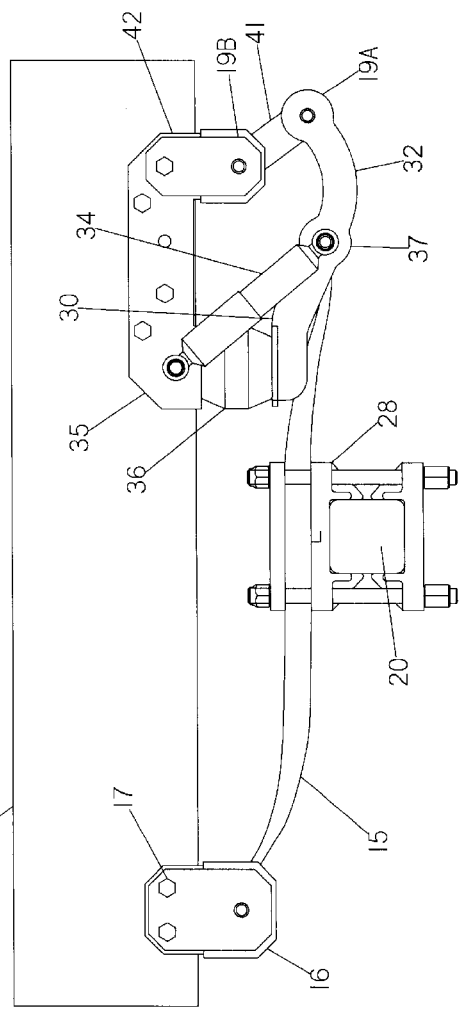

HEAVY DUTY TRUCK SUSPENSION

BACKGROUND OF THE INVENTION

The present invention relates to an improved suspension for vehicles particularly for vehicles such as trucks which are designed to carry heavy loads. It is known that leaf spring suspensions are well suited to support heavy loads and give the driver a good perception of the vehicles's behavior through the steering column. However, trucks with leaf spring suspensions are relatively hard riding, and further when a truck is under a heavy load, steering of the truck is unstable.

Previous attempts to provide a smooth ride with stable steering included the systems disclosed in U.S. Pat. Nos. 4,998,749 and 4,397,478. These patents are intended to improve the ride and handling of heavy load vehicles; however, the prior art still lacks the responsive steering and handling that is desired by a truck driver.

Accordingly it is an object of this invention to provide a suspension system for combining the advantageous feature of leaf spring suspension and a rubber or air suspension to provide comfortable driving and riding conditions and excellent responsive steering for a heavy duty vehicle. The inventive suspension has flexibility to provide improved ride, better control of steering, and improved overload capabilities.

SUMMARY OF THE INVENTION

The invention discloses a front axle suspension for a heavy duty vehicle. The suspension comprises an elongated leaf spring means having its front end affixed to the vehicle frame for movement about a first pivot point on an axis parallel to the vehicle axles. A load and shock transmitting lever system or load equalizer is mounted on the rear end of the leaf spring. The lever system is pivotally mounted at about its midpoint to the rear end of the leaf spring for pivotal movement about a second axis parallel to the first axis. The rear end of the lever is pivotally affixed to a shackle to the vehicle frame. A rubber spring is positioned on the forward end of the lever to bear against the underside of the frame. A standard shock absorber is mounted between the center pivot point of the lever and the frame.

The equalizer in cooperation with the rear end of the leaf spring provides a connection which is capable of transferring loads and shocks from the leaf spring to the equalizer and thence to the vehicle frame thus providing a smoother ride and better steering control.

The foregoing features and advantages of the present invention will be apparent from the following more particular description of the invention. The accompanying drawings, listed hereinbelow, are useful in explaining the invention.

BRIEF DESCRIPTION OF THE DRAWINGS

FIG. 1 depicts the invention as mounted on a truck frame for a front axle;

FIG. 2 is a perspective side view of the leaf spring and rubber spring combination;

FIG. 3 a side view of the inventive system which more clearly shows the equalizer assembly;

FIG. 4 is a top view of the system of FIG. 3 to show the positioning the equalizer assembly beneath the frame; and FIG. 5 is a relatively enlarged view of one of the bushings of FIG. 3.

DESCRIPTION OF THE INVENTION

FIG. 1, which is not to scale, is shown to depict the positioning and mounting of the inventive system 11 on a heavy duty truck 12. The suspension system is mounted on the front axle 20 of the vehicle; as is obvious, a similar suspension system is mounted on the right side of the truck 12. FIG. 3 shows the inventive system in relatively expanded view to more clearly show the details of the system as mounted on the frame 14 of the truck 12. The front end of an elongated leaf spring 15 is attached to the frame 14 by a suitable bracket 16. The bracket itself may be affixed to frame 14 such as by suitable bolts 17, welding, or riveting, as is well known. Bracket 16 includes a rubber bushing 18 (identical to the bushing shown in FIG. 6, to be explained below). Bushing 16 is received through an eye or loop formed at the front end of the leaf spring 15 to provide a pivot point for the leaf spring. The front end of the leaf spring 15 thus pivots about an axis parallel to the vehicle axle 20.

The leaf spring 15 is a single tapered leaf spring that is constructed of spring steel material of predetermined stiffness. The single tapered leaf spring 15 reduces vehicle weight by at least 100 pounds as compared to conventional multi-leaf steel springs of equal load capacity. Additionally the single tapered leaf spring is constructed of a thickness in a range of 1.50 to about 3.0 inches; this compares with a multi-leaf spring which has a thickness of about 8.0 inches. This reduction in thickness of the inventive leaf spring allows the vehicle front to be lowered approximately 5 to 6.5 inches which, in turn, lowers the vehicle 12 center of gravity to thereby increase vehicle stability and to deter vehicle roll.

Briefly refer to FIG. 5, which shows the bushing components. The bushings used in the inventive system are all similar and are generally labeled as 18 herein. As shown in FIG. 5, the bushing 18 is of urethane material of preselected hardness. Steel support disks 26 are positioned on either end of the urethane material for additional support. In the showing of FIG. 5, the two halves of the bushing are inserted into the eye of the leaf spring 15, and this assembly is mounted in bracket 16 by the associated bolt or pin assembly 19. Note that for added strength, the bolt or pin 19 is of hardened steel, and the bolt extends outwardly of the bracket 16 before the thread starts.

Refer back now to FIGS. 2 and 3. The forward end of leaf spring 15 is thus secured to frame 14 so that the spring is pivotable about bushing 18. The mid section of the leaf spring 15 is secured to the axle 20 by a bracket 28. In the instance shown, the axle 20 of the heavy duty truck 12 is essentially square; hence an upper and lower plate bracket and bolt arrangement, generally labelled 28, is provided to securely affix the mid portion of the leaf spring 15 over the top of axle 20. As will be appreciated suitable known U-shaped brackets are provided for vehicles having round axles.

The rear end of the leaf spring 15 is affixed to the inventive equalizer unit 30, as will be explained. The equalizer 30 comprises a lever 32 pivotally mounted as by a suitable bolt and bushing, indicated as 37, at about its midpoint to a loop formed on the rear end of leaf spring 15. Note that the lever 32 is mounted to, or on, the rear end of spring 15. The lower end of a shock absorber is also mounted on the rear end of leaf spring 15. The upper end of the shock absorber is mounted onto frame 14 by any suitable bolts and bushings. Shock absorber 34 is internally valved to dampen the axle jounce action effected by leaf spring 15.

A rubber spring 36 is mounted on a suitable mounting plate on the forward end of the lever 32. The upper end of the rubber spring 36 is mounted to a bracket 35 on frame 14 by any suitable means. The rubber spring 36 is thus supported on the lever 32 and bears firmly and solidly against bracket 35 and against the lower side of the frame 14.

Rubber spring 36 is selected based on load capacity of the vehicle. In the embodiment shown, an Aeon (TM) rubber spring of a predetermined size for the load capacity of the particular vehicle is selected. The Aeon spring has the proper flexibility to provide a softer vehicle ride with an empty load, and when the vehicle is loaded it still delivers an improved ride and provides over-load capabilities. Other suitable rubber springs may be used.

The rear end of the lever 32 is pivotally mounted by a bushing and bolt 19A to the lower end of a shackle 41. The upper end of shackle 41 is pivotally mounted on a bushing 18B and bolt assembly 19B of a suspension hangar 42 that is itself affixed to frame 14 by suitable bolts or rivets. The hangar 42, and the end of the lever 32, are relatively positioned such that, in a stationary condition, the shackle 41 angles forward about fifty five degrees with the horizontal, substantially as shown in FIG. 3. When the vehicle is in a loaded condition, the load forces are carried through pivots at 37 and at 19A and distribute the load to the equalizer lever 32, as well as to the rubber spring 36. As stated above, the rubber spring 36 has the flexibility to deliver an improved ride in both cases, that is with the vehicle empty or loaded.

As will be appreciated, movement of the axle causes movement of the leaf spring 15 relative to the equalizer 30 and to stabilize control of the vehicle, the shackle 41 permits the rear end of the leaf spring to move up and down and assist in control of the vehicle, as will be explained. Since the lever 32 pivots about bolt 37 the forward end of the lever of equalizer 30 and the rubber spring move up and down. The arrangement of the brackets is such that rubber spring 36 has only minimal horizontal (side to side) movement.

Thus lever 32 of equalizer 30 is attached pivotally at its mid section to the rear end of leaf spring 15. The front end of lever 32 supports the rubber spring 36, and the back end of lever is pivotally mounted on shackle 41. The upper end of the rubber spring 36 bears against frame 14 and the upper end of shackle is pivotally affixed to frame 14. The pivoting action of shackle 41 absorbs the axle rebound action and arc movement. When the vehicle is in a loaded position, load forces are carried through front pivot at 37 and the rear pivot 19A. Note that the front pivot point 37 is at the rear end of the leaf spring 15. These load forces are distributed into equalizer 30, including the rubber spring 36 and the shackle 41 which bear upwardly against the vehicle frame 14. The operative result is that the invention provides a smooth ride and tight steering control of the vehicle under conditions when the vehicle is loaded, as well as when it is empty.

In operation, the inventive suspension system functions to provide various improved characteristics. On rough terrain and/or for example when the wheel of the axle encounters a pot hole, the leaf spring suspension has a slow response so that the impact force to which the truck is subjected is transferred to the truck frame. Such impact forces cause discomfort to the truck operators and may also damage the vehicle frame, the axle, the suspension as well as the cargo. In the present invention, when the wheel of an axle hits a pot hole, the leaf spring 15 drops down. This dropping movement causes the equalizer lever 32 to go down relative to the frame 14. Note that the shock absorber 34 dampens the downward movement of the rear end of leaf spring 15 and the midpoint of the lever 32. When the rear end of spring 15 goes down, shackle 41 moves to a more vertical position. Also the forward end of the lever 32 moves down causing the rubber spring 36 to tend to elongate.

On the movement of the wheel 21 out of the pot hole, the leaf spring 15 moves upward. This causes the shackle 41 of the lever to go to an angled position, as indicated in FIG. 3. Likewise, the forward end of lever 32 will tend to move up and rubber spring 36 will be compressed. The forward and rear forces on lever 32 will be equalized and combine with the force present at the rear end of the leaf spring 15, to effect a cushioning action to any shock effective on frame 14. Note that combined action and reaction of equalizer 30 in conjunction with the rubber spring 36 and the flexibility of the leaf spring 15 is utilized fully to smooth out the shock forces on the frame 14 and thus provide a smoother ride.

It should be appreciated that an air spring may be used in lieu of the rubber spring 36. An air spring would connect to a leveling valve which connects to an air supply via an adjustable pressure regulator. An air control leveling valve may be controlled by a lever connected with the axle of the vehicle or to a spring bracket.

While the invention has been particularly shown and described with reference to a particular embodiment thereof it will be understood by those skilled in the art that various changes in form and detail may be made therein without departing from the spirit and scope of the invention.

I claim:

1. A front axle suspension system for heavy load carrying vehicles, said vehicles including a body, a frame and a wheel axle beam mounted transverse to said frame, said suspension system comprising;

a) an elongated leaf spring having a forward end, a mid-section and a rear end;

b) means connecting said forward end of said leaf spring to said vehicle frame for pivotal movement of said leaf spring about a first axis extending transversely of said frame;

c) means connecting said mid-section of said leaf spring to said axle beam;

d) an equalizer assembly including a lever arm having a a forward end, a center section and a rear end, said lever having its center section pivotally mounted on said rear end of said leaf spring;

e) a rubber spring mounted on said forward end of said lever arm, said rubber spring bearing upwardly against said frame;

f) a shock absorber having first and second ends, said first end being mounted at said center section of said lever arm and said second end being mounted to said frame for absorbing jounce forces, and g) a pivoting shackle having a first and second ends, said first end being mounted on said rear end of said lever arm, and said second end being pivotally mounted on said frame.

2. Apparatus as in claim 1 wherein said leaf spring comprises a single tapered leaf spring to reduce the weight of the suspension system and to lower the center of gravity of the vehicle and thereby minimize any tendency for roll.

\* \* \* \* \*